United States Patent [19]

Vanderheiden

[11] Patent Number: 4,714,603
[45] Date of Patent: Dec. 22, 1987

[54] SPHERICALLY SHAPED PRECIPITATED CALCIUM CARBONATE, ITS PREPARATION AND USE

[75] Inventor: Dennis B. Vanderheiden, Easton, Pa.

[73] Assignee: Pfizer, Inc., New York, N.Y.

[21] Appl. No.: 860,946

[22] Filed: May 8, 1986

Related U.S. Application Data

[63] Continuation-in-part of Ser. No. 662,103, Oct. 18, 1984, abandoned.

[51] Int. Cl.$^4$ .......................... C01F 5/24; C01F 11/18
[52] U.S. Cl. ..................................... 423/432; 423/430
[58] Field of Search ........................ 423/430, 432, 165

[56] References Cited

U.S. PATENT DOCUMENTS

| | | | |
|---|---|---|---|
| 3,179,493 | 4/1965 | Diekmann et al. | 23/66 |
| 3,304,154 | 2/1967 | Kiouzes-Pezas | 23/66 |
| 3,848,059 | 11/1974 | Erneta | 423/327 |
| 4,018,877 | 4/1977 | Woode | 423/432 |
| 4,157,379 | 6/1979 | Arika et al. | 423/432 |
| 4,237,147 | 12/1980 | Mertew et al. | 423/432 |
| 4,244,933 | 1/1981 | Shibazaki et al. | 423/430 |

FOREIGN PATENT DOCUMENTS

| | | |
|---|---|---|
| 46-7374 | 2/1971 | Japan . |
| 46-14821 | 4/1971 | Japan . |
| 54-4300 | 1/1979 | Japan . |
| 55-95617 | 7/1980 | Japan . |
| 57-92520 | 6/1982 | Japan . |
| 57-92521 | 6/1982 | Japan . |

OTHER PUBLICATIONS

Reitemeier et al, J. Phys. Chem., 44, 535–551 (1940).
Buehrer et al, J. Phys. Chem., 44, 552–574 (1940).
Nakahara et al, J. Chem. Soc., Japan, 5, 732–6 (1976), with English translation.
Kamiya et al, Mat. Res. Bull., 12, 1095–1102 (1977).

Primary Examiner—Gary P. Straub
Attorney, Agent, or Firm—Peter C. Richardson; Lawrence C. Akers; Harold W. Ordway

[57] ABSTRACT

A precipitated calcite of substantially spherical morphology having an average spherical diameter of from 2 to 10 microns and a specific surface area of from 1 to 15 square meters per gram is prepared by introducing carbon dioxide gas into an aqueous slurry of calcium hydroxide containing dissolved polyphosphate in the amount of from 0.1 to 1.0 percent, calculated as grams of phosphorus per 100 grams of the calcite equivalent of the calcium hydroxide, the starting temperature of the carbonation being 15° to 50° C. The spherical calcite is particularly suitable for use in dull finish coated paper.

9 Claims, 2 Drawing Figures

SPHERICALLY SHAPED PRECIPITATED CALCIUM CARBONATE, ITS PREPARATION AND USE

CROSS-REFERENCE TO RELATED APPLICATIONS

This is a continuation-in-part of copending application Ser. No. 06/662,103, filed Oct. 18, 1984, now abandoned.

BACKGROUND OF THE INVENTION

This invention concerns a novel precipitated calcium carbonate of spherical morphology as well as a method for its preparation and its use in such as paper coatings.

Today's coated papers are graded primarily on the basis of their brightness. Within each grade, however, exist subcatgories defined by sheet gloss. Papers with a 75° sheet gloss of from 1 to 20% are generally considered matte finish papers, from 20 to 40% dull finish paper, from 40 to 55% mid-gloss papers, and above 55% enamel papers. These definitions are general, with some overlap in sheet gloss and brightness between consecutive grades. Certain esthetic optical properties of paper are also commonly associated with functional performance. This is seen, for example, in the relationship of high sheet gloss to high print gloss and a high degree of printing smoothness. Dull and matte finish papers have historically been rougher and lower in print gloss than enamel papers, a consequence of the pigments and formulations utilized and the finishing techniques employed in their manufacture.

While numerous pigment combinations have been employed in attempting to produce a coated paper having a combination of dull finish and good printability, the need still exists for a coating pigment formulation which will accomplish this in a simple and economic manner. This need is satisfied by the present invention.

Precipitated calcium carbonate in spherical or globular form is known. In U.S. Pat. No. 3,304,154, for example, a finely divided precipitated calcium carbonate of generally spheroidal form is prepared by reacting a suspension of calcium hydroxide with carbon dioxide in a closed vessel at elevated temperature and pressure while rotating the vessel. In U.S. Pat. No. 3,848,059, spheroidal shaped reticulated precipitated calcium carbonate of 0.1 to 5 microns is prepared by the double decomposition of two water-soluble salts such as calcium chloride and potassium carbonate dissolved in water droplets of two water-in-oil emulsions. Nakahara et al, J. Chem. Soc. Japan, 5, 732 (1976), discloses the preparation of a globular or amorphous calcium carbonate by a similar interfacial reaction technique. Japanese Kokai No. 55-95617 discloses the preparation of globular-shaped calcium carbonate prepared by solution reaction of soluble calcium and carbonate salts at 70° C. or below. Japanese Kokai No. 57-92520 purportedly prepares a spherical vaterite by a similar technique but in the presence of a divalent cation other than calcium, conversion of the vaterite to calcite being disclosed in Kokai 57-92521. Japanese Kokai No. 54-4300 prepares a fine spherical calcium carbonate by spraying a pressurized aqueous carbonate solution into an aqueous calcium salt solution, while Kamiya et al, Mat. Res. Bull., 12, 1095 (1977) discloses a calcium carbonate hydrate spherulite precipitated in a solution containing magnesium ion which decomposes in water to aragonite. Buehrer et al, J. Phys. Chem., 44, 552 (1940) discloses a distorted calcite in apparently globular form precipitated from solution in the presence of sodium hexametaphosphate. Such precipitation of calcium carbonate in the presence of sodium hexametaphosphate is also disclosed in U.S. Pat. Nos. 3,179,493, 4,018,877 and 4,244,933 as well as by Reitemeier et al, J. Phys. Chem., 44, 535 (1940). Of these precipitations, only U.S. Pat. Nos. 4,018,877 and 4,244,933 contemplate carbonating a lime slurry.

In U.S. Pat. No. 4,157,379, a corpuscular calcium carbonate is prepared by carbonation of a calcium hydroxide slurry in the presence of both a chelating agent and a water-soluble metal salt, including sodium pyrophosphate. Japanese Kokai No. 46-7374 discloses the production of large, crude crystals of precipitated calcium carbonate by reacting milk of lime and carbon dioxide following addition of condensed alkali phosphate, while Japanese Kokai No. 46-14821 discloses the addition of alkali polyphosphate plus an inorganic electrolyte to an already precipitated calcium carbonate to redisperse it in water.

SUMMARY OF THE INVENTION

It has now been found that the controlled addition of gaseous carbon dioxide to aqueous calcium hydroxide in the presence of limited amounts of surface active polyphosphate produces a novel spherically shaped precipitated calcite of uniform particle size and low surface area which is eminently suitable for use in such as dull finish coated paper.

Accordingly, the present invention entails a precipitated calcite having particles of substantially spherical morphology with an average spherical diameter of from about 2 to 10 microns, a particle size distribution such that at least about 50 weight percent of the particles lie within 50 percent of the average spherical diameter, a specific surface area of from about 1 to 15 square meters per gram, a void volume of from about 0.5 to 1.0 cubic centimeter per gram, and up to about 5000 surface nodules per particle, the nodules having a height of from about 0.02 to 1.0 micron and an aspect ratio of less than about 2. Preferably the precipitated calcite has an average spherical diameter of from about 2 to 5 microns with at least 60 weight percent of the particles lying within 50 percent of the average spherical diameter.

The present invention also entails a process for preparing a precipitated calcite of substantially spherical morphology, which comprises introducing gaseous carbon dioxide into an aqueous slurry of calcium hydroxide containing dissolved polyphosphate in the amount of from about 0.1 to 1.0 percent, calculated as grams of phosphorus per 100 grams of the calcium carbonate equivalent of the calcium hydroxide, the introduction being started at a temperature of from about 15° to 50° C.

Preferably, the dissolved polyphosphate is sodium hexametaphosphate; the introduction is started at a temperature of from about 30° to 35° C. with the temperature being permitted to rise a maximum of about 35° C. during the introduction; and the calcium hydroxide in the slurry is prepared at a concentration of from about 15 to 20 weight percent by reacting lime (calcium oxide) with water at a starting temperature of from about 10° to 45° C. The carbonation is normally terminated at a pH of about 7, the introduction requiring a period of from about 40 to 100 minutes, and the slurry following termination of the introduction is treated with sufficient polybasic acid to essentially neutralize any unconverted calcium hydroxide in the slurry.

The present invention further contemplates a paper sheet having on at least one of its surfaces a coating with a 75° gloss of from about 20 to 40 percent, the coating comprising the presently claimed precipitated calcite.

BRIEF DESCRIPTION OF THE DRAWINGS

Novel features and advantageous of the present invention will become apparent to those skilled in the art from a reading of the following detailed description in conjunction with the accompanying drawing, wherein.

DETAILED DESCRIPTION OF THE INVENTION

Figure 1:
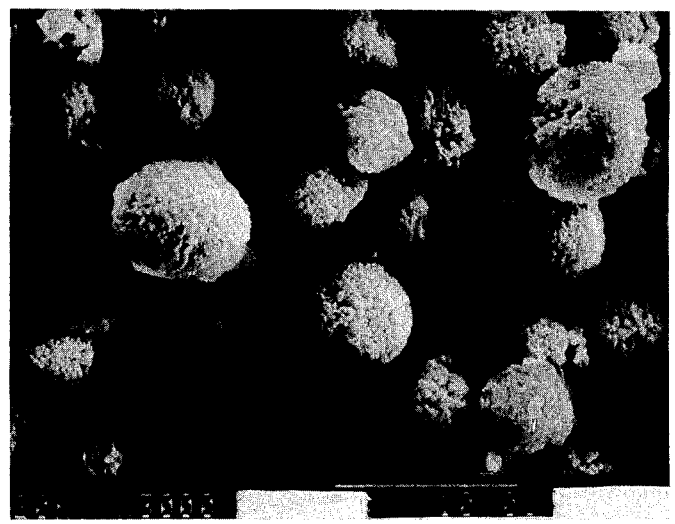
FIG. 1 is a photomicrograph at a magnification of 3000 of the precipitated calcite of substantially spherical morphology of the present invention.

The process of the present invention, by carbonating aqueous lime slurries at a starting temperature of from about 15° to 50° C. in the presence of a specified amount of surface active polyphosphate, provides a simple and economic means of obtaining a stable precipitated calcium carbonate of unique spherical morphology in a size that can be readily controlled.

The product of the process, a calcite, normally has an average spherical diameter of from about 2 to 10 microns, a particle size distribution such that 50 weight percent of the particles lie within 50 percent of the average spherical diameter, a specific surface area of from about 1 to 15 square meters per gram, and a void volume of from about 0.5 to 1.0 cubic centimeter per gram. The surface of the calcite particles have up to about 5000 essentially circular nodules per particle, the nodules ranging in height and in diameter from about 0.02 to 1.0 micron, the aspect ratio, i.e., the ratio of the height to the diameter of the nodule, being less than about 2. Preferably, the average spherical diameter of the particles is from about 2 to 5 microns with about 60 weight percent of the particles lying within 50 percent of the average spherical diameter. With proper selection of reactants, the calcium carbonate content of the product can be greater than 97 percent, the only impurities normally being the added polyphosphate, magnesium carbonate and/or hydroxide from the starting lime, and intercrystalline water.

The surface active polyphosphates employed in the instant process are surfactants commonly used as scale inhibitors, sequestrants, deflocculants and detergent promoters. Any water-soluble polyphosphate phosphate of the formula $M_{(n+2)}P_nO_{(3n+1)}$ or $(MPO_3)_n$ wherein M is hydrogen, ammonium or alkali metal and n is an integer of 2 or greater, can be used. Such polyphosphate in which an alkaline earth metal or zinc is the cation may also be used. Particularly suitable polyphosphates include the alkali metal polyphosphates and metaphosphates wherein n is from 2 to 25. Preferred are alkali metal pyrophosphate, tripolyphosphate and especially sodium hexametaphosphate.

In employing the surface active polyphosphate of the instant invention, the polyphosphate is added to the calcium hydroxide, or slaked lime, slurry prior to carbonation of the slurry. The polyphosphate is added in levels of from about 0.1 to 1.0 percent, calculated as grams of phosphorus per 100 grams of the calcium carbonate equivalent of the lime content of the slurry. The addition of the polyphosphate at a level below about 0.1 percent phosphorus tends to produce scalenohedral calcite rather than the desired calcite of spherical morphology, while additions above about 1.0 percent produce declining amounts of spherical calcite mixed with larger and smaller particles of nondescript morphology. The preferred addition is from about 0.15 to 0.3 percent.

The spherical calcite of the present process is obtained only when the temperature for the carbonation of the lime slurry is carefully controlled. To consistently produce the desired product, the starting temperature of the carbonation must be from about 15° to 50° C. By starting temperature is meant the temperature of the lime slurry at the start of the introduction of carbon dioxide gas after the polyphosphate has been added. If the starting temperature of the carbonation is below about 15° C., the product tends to be smaller than the desired minimum of about 2 microns with an unacceptably high surface area, while a starting temperature of greater than about 50° C. tends to produce calcite of scalenohedral morphology rather than the desired calcite of spherical morphology. Preferably the starting temperature for producing the desired particle is from about 30° to 35° C.

While the starting temperature of the carbonation is critical in producing a precipitated calcite of the desired morphology and size, the temperature during the remainder of the carbonation also tends to influence the resulting precipitate. Therefore, the temperature is preferably limited to a maximum rise of about 35° C. during the introduction.

The nature of the carbon dioxide gas for the carbonation is not particularly critical, the standard mixtures of carbon dioxide in either nitrogen or air commonly used for such carbonations being satisfactory. Likewise, the nature of the source for the starting calcium hydroxide slurry is not critical; either lime or hydrated lime (calcium hydroxide) may be used. The purity of the carbonating gas and the lime essentially determine the purity of the final product.

While the present process is applicable to all concentrations of lime slurries which can be carbonated, it is practically limited to those slurries in which the calcium hydroxide concentration of the starting slurry is greater than about 5 weight percent. Lower concentrations are generally uneconomic. For most economic operation, the concentration of the calcium hydroxide in the slurry to be carbonated is preferably from about 15 to 20 percent by weight. As with the concentration, the particle size of the calcium hydroxide is not critical. When dry hydrated lime (calcium hydroxide) is slurried in water for the carbonation, a maximum particle size of from about 40 to 200 microns is preferred, while when calcium oxide is slaked to form the hydroxide, the slaking is preferably conducted starting at a temperature of from about 10° to 45° C.

The carbonation of the lime slurry is continued until the calcite precipitation is substantially complete, preferably being terminated when the pH of the carbonated slurry is at about 7. Such carbonation is usually accomplished in a period of about 2 hours or less, a period of from about 40 to 100 minutes being preferred. Normal care is exercised to neutralize any unreacted calcium hydroxide still present in the carbonated slurry. Various techniques known to those skilled in the art can be used to accomplish this neutralization. These include, for example, monitoring the slurry pH with introduction of additional carbon dioxide gas as is necessary as well as treating the carbonated slurry with a sufficient amount of an organic or inorganic polybasic acid such as citric, maleic, malic, malonic, phthalic, tartaric, boric, phosphoric, sulfurous or sulfuric acid.

The calcium carbonate in the final slurry may be utilized as such, or may be filtered, dried and milled for use as a dry product.

The product of the present invention has been found to be especially useful as a pigment in formulations used to produce a dull coated paper sheet with a 75° gloss of from about 20 to 40 percent. Such coating formulations, in addition to showing superior rheology have produced coated paper having good opacity, brightness, smoothness and ink receptivity as well as the desired gloss and printability. Its use in matte and mid-gloss coated papers, as well as in dentrifice formulations as an abrasive, is also contemplated.

The following examples are merely illustrative and are not to be construed as limiting the invention, the scope of which is defined by the appended claims.

EXAMPLE 1

The following carbonation was conducted in a 32-liter jacketed, baffled, cylindrical stainless steel reactor having an internal diameter of 29 cm, a height of 46 cm and a conical bottom about 4 cm deep, equipped with a high speed agitator having two 15 cm diameter flat-blade turbine impellers positioned about 2.5 cm and 13 cm above the bottom of the straight side of the reactor and driven by a 1.5 horsepower continuous duty motor. A carbon dioxide/air gas stream was introduced through vertical copper tubing of about 1 cm internal diameter and distributed by means of a horizontal copper sparge ring of about 15 cm overall diameter positioned near the bottom of the straight side of the reactor and having eight evenly spaced 0.3 cm diameter holes to facilitate gas dispersion.

A 15.5 weight percent aqueous calcium hydroxide, or milk of lime, slurry was prepared by adding over about a 90-second period 2.68 kg of granular active lime having an available calcium oxide content of about 93 weight percent, as determined by ASTM procedure C-25-72, to 18.75 kg of tap water at 33° C. contained in the carbonator and stirred at about 400 RPM. After stirring the resulting slurry for about 10 minutes, 35.6 g of sodium hexametaphosphate (Baker Grade [$NaPO_3$]$_6$, J. T. Baker Chemical Co., Phillipsburg, New Jersey; equal to about 0.24 percent, calculated as grams of phosphorus per 100 grams of the calcium carbonate equivalent of the calcium hydroxide content of the slurry) dissolved in 1.62 liters of tap water was added. The slurry was then cooled from the final slaking temperature of 51° C. to 35° C. by means of the cooling jacket. The agitator was adjusted to about 500 RPM, and the slurry was carbonated by passing a gas mixture of 28 volume percent carbon dioxide in air at about 64 standard liters per minute (SLM) through the slurry over a 60-minute period while allowing the slurry temperature to rise unchecked. To the final carbonated slurry at pH 7-7.5 and 59° C. was added 15.7 g of phosphoric acid (Baker Analyzed Reagent 85% $H_3PO_4$, J. T. Baker Chemical Co.; equivalent to about 0.3 weight percent of the calcium carbonate equivalent of the calcium hydroxide content of the slurry) diluted with 100 g tap water.

The slurry was passed through a U.S.A. Standard No. 325 (45 micron) sieve to remove the grit present in the original lime, and then vacuum filtered. The filter cake was air dried overnight at 120° C. to yield a precipitated calcite product of substantially spherical morphology having a specific surface area (SSA) of 1.86 $m^2/g$ and an average spherical diameter (ASD) of 5.4 microns with 77 weight percent of the particles within plus or minus 50 percent of the average spherical diameter, i.e., 2.7 to 8.1 microns.

Figure 2:
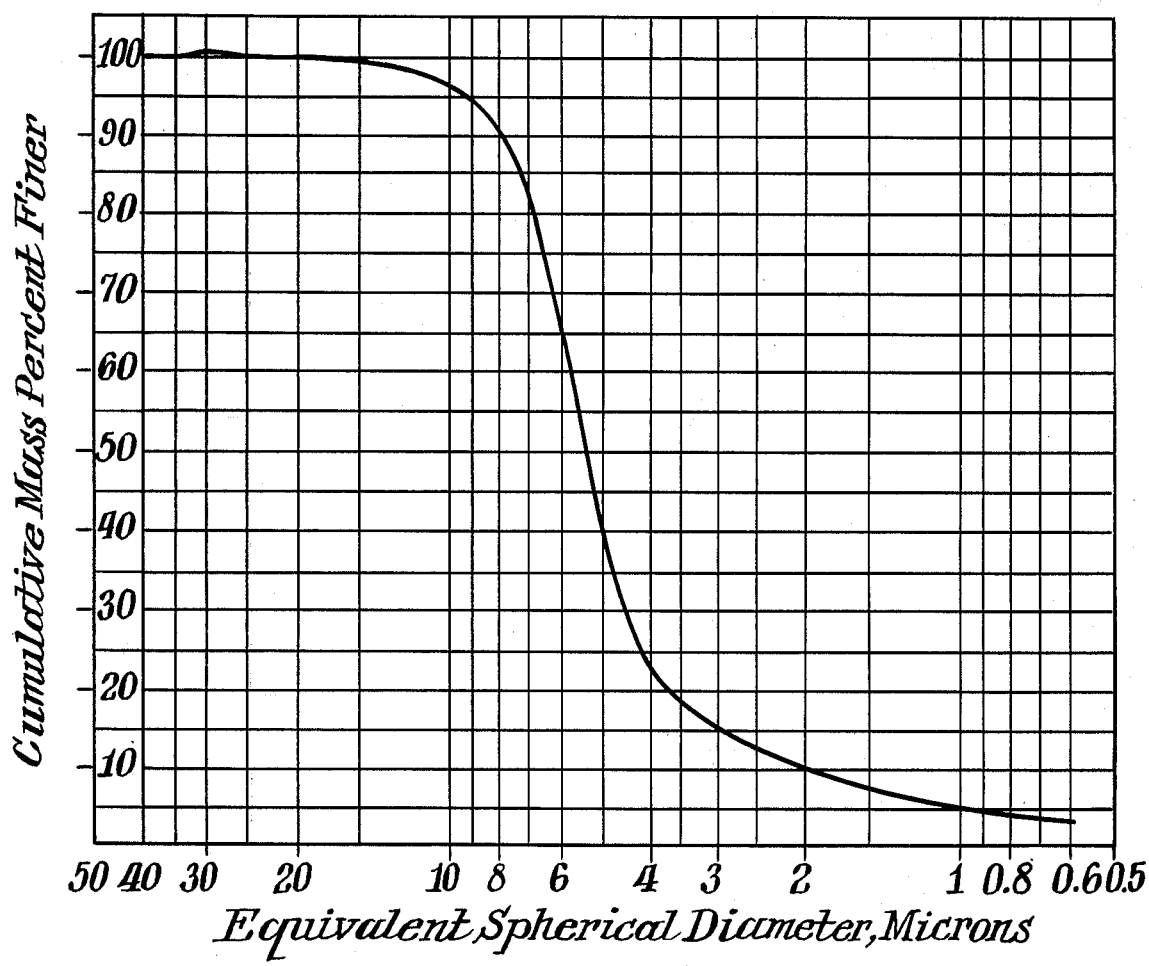
FIG. 2 is a representation of the particle size distribution of the precipitated calcite.

A photomicrograph of the product at a magnification of 3000 is shown in FIG. 1, while its particle size distribution is shown in FIG. 2. The surface area of the product was measured using a Micromeritics DigiSorb 2600, which employs the standard BET theory with nitrogen as the adsorbing gas. The particle size distribution (PSD) of the product was determined by a sedimentation technique using an aqueous dispersion of the product and a Micromeritics SediGraph Model 5000, the aqueous dispersion being prepared by adding 0.75-0.80 g of the dry calcium carbonate to 25 ml of a 0.1% aqueous carboxylated polyelectrolyte solution (Daxad 30; W. R. Grace and Co., Lexington, Mass.) and vibrating the mixture with 150 watts of ultrasonic energy for 5 minutes.

EXAMPLE 2

Precipitated calcite of spherical morphology was prepared following the slaking, carbonation and isolation procedures of Example 1, except that the initial slaking water temperature was 27° C. and the level of sodium hexametaphosphate was varied, with the results as indicated in the following table.

| | | Product | | |
|---|---|---|---|---|
| Run | ($NaPO_3$)$_6$, % P | ASD, microns | ± 50% of ASD, % | SSA, $m^2/g$ |
| 2A | 0.12 | 2.5 | 85 | 12.9 |
| 2B | 0.18 | 2.8 | 83 | 4.3 |
| 2C | 0.30 | 4.4 | 64 | 3.8 |
| 2D | 0.46 | 6.8 | 69 | 4.9 |
| 2E | 0.68 | 9.6 | 69 | 10.9 |
| 2F | 0.91 | 10.0 | 52 | 9.1 |

Carbonation of the slaked lime slurry at a sodium hexametaphosphate level of 0.06% phosphorus (% P) produced a calcite of scalenohedral morphology.

EXAMPLE 3

Precipitated calcite of spherical morphology was prepared following the procedures of Example 1, except that the initial slaking water temperature was 21° C. and the initial carbonation temperature was varied, with the results as indicated in the following table.

| | Temp, °C. | | Product | | |
|---|---|---|---|---|---|
| Run | Start | End | ASD, microns | ± 50% of ASD, % | SSA, $m^2/g$ |
| 3A | 15 | 51 | 2.0 | 69 | 8.9 |
| 3B | 30 | 59 | 3.0 | 76 | 3.6 |
| 3C | 45 | 65 | 5.8 | 71 | 3.1 |
| 3D | 50 | 70 | 3.9 | 80 | 3.3 |

Carbonation at a starting temperature of 5° C. produced a precipitated calcium carbonate of non-descript morphology, while carbonation at starting temperatures of 55° C. and above produced a precipitated calcite of scalenohedral morphology.

EXAMPLE 4

Precipitated calcite of spherical morphology was prepared following the procedures of Example 1, except that the initial slaking water temperature was varied, with the results as indicated in the following table.

| Run | Initial Slaking Temp, °C. | Product ASD, microns | ± 50% of ASD, % | SSA, $m^2/g$ |
|---|---|---|---|---|
| 4A | 41 | 1.9 | 75 | 6.8 |
| 4B | 12 | 6.8 | 75 | 8.1 |

EXAMPLE 5

Precipitated calcite of spherical morphology was prepared following the procedures of Example 1, except that the initial slaking water temperature was 27° C. and the batch carbonation time was varied, with the results shown in the following table.

| Run | Carbonation Time, min | Product ASD, microns | ± 50% of ASD, % | SSA, $m^2/g$ |
|---|---|---|---|---|
| 5A | 49 | 2.8 | 80 | 4.4 |
| 5B | 82 | 4.2 | 63 | 3.6 |
| 5C | 95 | 5.2 | 61 | 3.3 |

EXAMPLE 6

Precipitated calcite of spherical morphology was prepared following the procedures of Example 1, except that the initial slaking water temperature and the concentration of the calcium hydroxide slurry, as well as the gas delivery rate to maintain a batch carbonation time of about 60 minutes, were varied, with the results as indicated in the following table.

| Run | Ca(OH)$_2$ g/100 g Slurry | Initial Slaking Water Temp, °C. | Gas Rate, SLM | Product ASD, microns | ± 50% of ASD, % | SSA, $m^2/gm$ |
|---|---|---|---|---|---|---|
| 6A | 5.0 | 41 | 19 | 5.6 | 72 | 3.0 |
| 6B | 10.0 | 33 | 41 | 3.7 | 72 | 4.4 |
| 6C | 20.7 | 22 | 64 | 3.1 | 79 | 7.2 |
| 6D | 24.9 | 21 | 90 | 3.1 | 72 | 3.3 |

EXAMPLE 7

Precipitated calcite of spherical morphology was prepared following the procedures of Example 1, except that the aqueous calcium hydroxide slurry was prepared at a concentration of 14.9 weight percent by adding over a period of about 90 seconds 3.29 kg of commercial dry hydrated lime, or calcium hydroxide, to a total of 18.75 liters of tap water at about 35° C., using two different hydrate particle sizes, with the results as indicated in the following table.

| Run | Hydrate Size, Microns[1] | Product ASD, microns | ± 50% of ASD, % | SSA, $m^2/g$ |
|---|---|---|---|---|
| 7A | 45 | 3.8 | 69 | 5.2 |
| 7B | 150 | 3.8 | 70 | 5.0 |

[1] 95 weight % of particles less than indicated size

EXAMPLE 8

Precipitated calcite of spherical morphology was prepared using the procedures of Example 1, except that the initial slaking water temperature was 27° C. and both the type and level of dissolved polyphosphate were varied, with the results as indicated in the following table.

| Run | Polyphosphate Nature | g/100 g CaCO$_3$ | % P | Product ASD, microns | ± 50% of ASD, % | SSA, $m^2/g$ |
|---|---|---|---|---|---|---|
| 8A | Na$_4$P$_2$O$_7$·10H$_2$O[1] | 1.3 | 0.18 | 2.8 | 87 | 1.5 |
| 8B | Na$_4$P$_2$O$_7$·10H$_2$O[1] | 2.2 | 0.30 | 6.7 | 76 | 1.0 |
| 8C | Na$_5$P$_3$O$_{10}$[2] | 0.7 | 0.18 | 3.5 | 81 | 2.6 |
| 8D | Na$_5$P$_3$O$_{10}$[2] | 1.2 | 0.30 | 3.5 | 72 | 2.9 |

[1] sodium pyrophosphate decahydrate, Baker analyzed reagent, J. T. Baker Chemical Co.
[2] sodium phosphate tripoly, purified granular, Fisher Scientific Co., Fair Lawn, NJ

EXAMPLE 9

The calcite preparation of Example 2 was repeated at sodium hexametaphosphate levels of 0.18, 0.33 and 0.46 percent (calculated as grams phosphorous per 100 grams calcium carbonate equivalent of the calcium hydroxide content of the slurry). The resulting calcites were then compared to the calcium carbonate product disclosed in U.S. Pat. No. 4,244,933, using the test procedures employed in that reference, with the following results.

| | Run | | | U.S. Pat. No. 4,244,933 | |
|---|---|---|---|---|---|
| | 9A | 9B | 9C | A | B |
| (NaPO$_3$)$_6$, % P | 0.18 | 0.33 | 0.46 | | |
| ASD, microns | 2.5 | 4.6 | 6.4 | | |
| ±50% of ASD, % | 82 | 62 | 63 | | |
| SSA, $m^2/g$ | 5.1 | 5.0 | 6.9 | 5–15 | 8–20 |
| SEM Analysis | | | | | |
| Nodules/particle | 625 | 2000 | 3000 | 100–4000 | 100–4000 |
| Nodule height (H), microns | 0.05–0.3 | 0.2–0.7 | 0.2–0.9 | 0.25–2.0 | 0.15–4.0 |
| Nodule diameter (D), microns | 0.05–0.2 | 0.15–0.5 | 0.2–0.7 | 0.08–0.2 | 0.05–0.2 |
| Aspect ratio, H/D | 1.2 | 1.3 | 1.2 | 3–10 | 3–20 |
| Void volume, cc/g | 0.93 | 0.70 | 0.67 | 1.0–1.8 | 1.8–3.3 |
| Sedimentation volume, ml | 11 | 10 | 8 | 20–50 | 50–70 |
| Angle of repose, ° | 50 | 48 | 52 | 30–40 | 45–60 |

-continued

|  | Run | | | U.S. Pat. No. 4,244,933 | |
| --- | --- | --- | --- | --- | --- |
|  | 9A | 9B | 9C | A | B |
| Viscosity, cps/60 wt % | 66 | 16 | 13 | 20–100 | 100–1000 |
| Oil absorption, ml/100 g | 49 | 27 | 24 | 45–60 | 50–100 |

EXAMPLE 10

The unique properties of the spherically shaped precipitated calcite of the present invention as a dull finish paper coating pigment were shown by substituting it for both a standard high gloss paper coating pigment and a typical ground limestone often used in dull coatings on an equal weight basis in a standard high gloss paper coating formulation using typical high gloss supercalendering conditions. The physical properties of the three pigments are given in Table I, while the paper coating formulation employed is indicated in Table II.

In each case, the coating colors were prepared by first slurrying the coating clay at 73 percent solids using 0.1 percent tetrasodium pyrophosphate dispersant, based on the clay, and a 2-inch Cowles-type mixer at 4900 RPM. The calcium carbonate pigment was similarly slurried at the highest possible solids using a sodium polyacrylate dispersant as required by the pigment's dispersant demand. At this point, 50 parts of the calcium carbonate pigment slurry was added to 50 parts of the clay slurry (dry weight basis) with the mixer at about 1500 RPM. The SBR latex and alkali reactive acrylic latex were then added, and the pH of the coating color was adjusted to between 8.5 and 9.0 with ammonium hydroxide. The calcium stearate lubricant and crosslinking agent were then added to complete the coating color formulation, and mixing was continued for about 5 minutes. The percent solids, pH and rheology of each coating color were evaluated as indicated in Table III.

The coatings were applied to a 62 pound prime coat base stock with a TIME/LIFE coater (Lewis Chambers Co., Macon, Ga.). Coatings were applied one side at a time followed by drying on a Duophoto Economy Dryer (Duophoto Corp., New York, N.Y.) at 218° F. (104° C.) for about 1 minute. All coated sheets were then conditioned for 24 hours at 73° F. (23° C.) and 50 percent relative humidity. After conditioning, coated paper samples chosen on the basis of nearly equivalent coat weights were calendered 2 nips on a laboratory calender operated at 600 pounds per linear inch with the rolls heated to about 150° F. (66° C.). To obtain ink gloss and allow detection of any mottling defect in the surface, a common problem with dull coated paper, coated test sheets were printed with a blue gloss ink on a Vandercook printing press. The results are shown in Table IV.

With the high gloss pigment producing a 75° paper gloss of 65 percent, it is clear that the coating and calendering conditions were in the normal range for high gloss enamel paper. The unique dulling characteristics of the spherical calcite pigment of the present invention under these conditions are apparent; the pigment not only outperformed the ground limestone in gloss reduction, but did so while maintaining a superior paper smoothness. The results also indicate a slightly more porous and ink receptive surface for the coated paper incorporating the spherical calcite pigment compared to that incorporating the ground limestone pigment.

TABLE I

| $CaCO_3$ Pigment | Morphology | ASD, microns | ± 50% of ASD, % | SSA, $M^2/g$ |
| --- | --- | --- | --- | --- |
| high gloss[1] | hexagonal prisms | 0.8 | 66 | 8.1 |
| ground limestone[2] | irregular | 1.9 | 38 | 5.6 |
| spherical calcite[3] | spherical | 2.7 | 80 | 6.0 |

[1]Albaglos ® PCC, Pfizer Inc., New York, NY
[2]Pfizer Inc.
[3]present invention

TABLE II

| Order of Addition | Component | Parts |
| --- | --- | --- |
| 1 | coating clay[1] | 50 |
| 2 | $CaCO_3$ pigment | 50 |
| 3 | SBR latex[2] | 12 |
| 4 | acrylic latex[3] | 3 |
| 5 | ammonium hydroxide | (to pH 8.5-9) |
| 6 | lubricant[4] | 0.5 |
| 7 | crosslinking agent[5] | 0.5 |

[1]No. 1 kaolin coating clay; Ultra White 90, Engelhard Corp., Edison, NJ
[2]styrene/butadiene rubber latex; Dow 615, Dow Chemical Co., Midland, MI
[3]AR-74, Rohm & Haas, Philadelphia, PA
[4]calcium stearate; Nopco C-104, Diamond Shamrock Corp., Cleveland, OH
[5]Parez 613, American Cynamid Co., Wayne, NJ

TABLE III

| | $CaCO_3$ Pigment Used in Coating Color | | |
| --- | --- | --- | --- |
| Test | High Gloss | Ground Limestone | Spherical Calcite |
| % Solids | 67.7 | 67.8 | 67.8 |
| pH | 9.3 | 8.9 | 9.0 |
| Viscosity, centipoise[1] | 3900 | 2750 | 4150 |
| Rheology[2] | | | |
| Shear Rate, RPM | 2600 | 4400 | 3200 |
| Shear Stress, $10^5$ dyne cm | 30 | 17 | 30 |

[1]Brookfield viscometer, Model RVT-100, spindle No. 2, 20 RPM, Brookfield Engineering Labs, Inc., Stoughton, MA
[2]Hercules high shear viscometer, Model 244AC, A-bob, 200,000 dyne cm/cm spring, Caltec Scientific Instruments, Inc., Kalamazoo, MI

TABLE IV

| | $CaCO_3$ Pigment Used in Coating Color | | |
| --- | --- | --- | --- |
| Coated Paper Test[1] | High Gloss | Ground Limestone | Spherical Calcite |
| Basis Weight (25 × 38-500) | 81.7 | 81.7 | 81.6 |
| Caliper, mils | 4.0 | 3.9 | 3.9 |
| Ash, % | 33.5 | 33.2 | 33.1 |
| TAPPI Brightness | 84.5 | 83.6 | 83.8 |
| TAPPI Opacity | 97.4 | 97.4 | 97.3 |
| Gurley Porosity, sec/100 cc | 3700 | 4400 | 3800 |
| Sheffield Smoothness, cc/sec | 21 | 34 | 19 |
| K&N, 2 minutes, % | 78.9 | 82.7 | 77.1 |
| Paper Gloss (75°), % | 65 | 53 | 39 |
| Paper Mottle Rating (visual) | pass | pass | pass |
| Print Gloss (75°), % | 93.5 | 92 | 88 |
| Print Mottle Rating, (visual) | pass | pass | pass |

[1]TAPPI Official Test Methods

EXAMPLE 11

Coated paper utilizing the spherical calcite of the present invention was compared with that utilizing a commercially available kaolin dull finish coating pigment. In this comparison, the procedures of Example 10 were followed, with the exception that the commercial dull finish coating clay constituted 100 percent of the coating pigment, the paper was coated on one side only, and the calendering was increased to 4 nips at 800 pounds per linear inch with the rolls at 120° F. (49° C.).

The physical properties of the pigments are summarized in Table V, the properties of the coating colors in Table VI, and the coated paper results in Table VII.

TABLE V

| Pigment | Morphology | ASD, microns | ± 50% of ASD, % | SSA, $M^2/g$ |
|---|---|---|---|---|
| high gloss $CaCO_3^{(1)}$ | hexagonal prisms | 0.8 | 66 | 8.1 |
| spherical calcite A[1] | spherical | 2.7 | 80 | 6.0 |
| spherical calcite B[2] | spherical | 4.2 | 60 | 3.9 |
| dull finish clay | platy | 1.8 | 32 | 8.7 |

[1]as in Table I
[2]present invention, larger size
[3]Satin Glo 30; Englehard Corp.

TABLE VI

| | 50/50 Coating Clay/$CaCO_3$ | | | |
|---|---|---|---|---|
| Test | High Gloss $CaCO_3$ | Spherical Calcite A | Spherical Calcite B | 100 Dull Finish Clay |
| % Solids | 68.0 | 66.8 | 67.1 | 63.4 |
| pH | 8.7 | 8.9 | 8.7 | 8.7 |
| Viscosity, centipoise[1] | 3900 | 1125 | 2425 | 1700 |
| Rheology[1] | | | | |
| Shear Rate, RPM | 2350 | 4400 | 4400 | 4400 |
| Shear Stress, $10^5$ dyne cm | 30 | 17 | 15 | 10 |

[1]see Table III

TABLE VII

| | 50/50 Coating Clay/$CoCO_3$ | | | |
|---|---|---|---|---|
| Coated Paper Test[1] | High Gloss $CaCO_3$ | Spherical Calcite A | Spherical Calcite B | 100 Dull Coating Clay |
| Basis Weight (25 × 38-500) | 69.8 | 69.5 | 69.9 | 70.0 |
| Caliper, mils | 3.8 | 3.6 | 3.7 | 3.7 |
| Ash, % | 23.5 | 23.9 | 24.1 | 24.0 |
| TAPPI Brightness | 85.8 | 85.5 | 85.3 | 82.9 |
| TAPPI Opacity | 95.2 | 94.8 | 94.7 | 94.7 |
| Gurley Porosity, sec/100 cc | 6100 | 5650 | 6650 | 6600 |
| Sheffield Smoothness, cc/sec | 31 | 38 | 42 | 37 |
| K&N, 2 minutes, % | 72.8 | 73.5 | 73.9 | 78.6 |
| Paper Gloss (75°), % | 59 | 35 | 31 | 39 |
| Paper Mottle Rating (visual) | pass | pass | pass | pass |
| Print Gloss (75°), % | 86 | 84 | 80 | 85 |
| Print Mottle Rating (visual) | pass | pass | pass | fail |

[1]TAPPI Official Test Methods

Paper coating employing the spherical calcite of the present invention again showed exceptional dulling efficiency while maintaining satisfactory brightness, opacity, porosity, smoothness and ink receptivity as well as an absence of paper and print mottling. This is in contrast to the coating utilizing 100 percent of the commercially available kaolin dull finish coating pigment, which had a satisfactory dull finish gloss but poorer brightness and ink receptivity with a printed surface showing excessive mottling.

I claim:

1. A precipitated calcite having particles of substantially spherical morphology with an average spherical diameter of from about 2 to 10 microns, a particle size distribution such that at least about 50 weight percent of the particles lie within 50 percent of the average spherical diameter, a specific surface area of from about 1 to 15 square meters per gram, a void volume of from about 0.5 to 1.0 cubic centimeter per gram, and a plurality of up to about 5000 surface nodules per particle, the nodules having a height of from about 0.02 to 1.0 micron and an aspect ratio of less than about 2.

2. The precipitated calcite of claim 1 wherein the average spherical diameter is from about 2 to 5 microns and at least 60 weight percent of the particles lie within 50 percent of the average spherical diameter.

3. A process for preparing a precipitated calcite of substantially spherical morphology, which comprises passing gaseous carbon dioxide through an aqueous slurry of calcium hydroxide initially containing dissolved polyphosphate as sole additive in an amount of from about 0.1 to 1.0 percent, calculated as grams of phosphorus per 100 grams of the calcium carbonate equivalent of the calcium hydroxide, the introduction being started at a temperature of from about 15° to 50° C.

4. The process of claim 3 wherein the dissolved polyphosphate is sodium hexametaphosphate.

5. The process of claim 3 wherein the introduction is started at a temperature of from about 30° to 35° C. with the temperature being permitted to rise a maximum of about 35° C. during the introduction.

6. The process of claim 3 wherein the calcium hydroxide in the slurry is prepared at a concentration of from about 15 to 20 weight percent at a slaking temperature starting at from about 10° to 45° C.

7. The process of claim 3 wherein the introduction is terminated at a pH of about 7.

8. The process of claim 7 wherein the introduction is for a period of from about 40 to 100 minutes.

9. The process of claim 7 wherein the slurry following termination of the introduction is treated with sufficient polybasic acid to essentially neutralize any unconverted calcium hydroxide in the slurry.

* * * * *